(12) United States Patent     (10) Patent No.:   US 12,596,243 B2

Chan                     (45) Date of Patent:        Apr. 7, 2026

(54) LASER SCANNING MICROSCOPE WITH ELECTRICAL HIGH-ORDER MODULATION EXTRACTION MODULE

(71) Applicant: NATIONAL YANG MING CHIAO TUNG UNIVERSITY, Hsinchu City (TW)

(72) Inventor: Ming-Che Chan, Tainan City (TW)

(73) Assignee: NATIONAL YANG MING CHIAO TUNG UNIVERSITY, Hsinchu City (TW)

( * ) Notice: Subject to any disclaimer, the term of this patent is extended or adjusted under 35 U.S.C. 154(b) by 0 days.

(21) Appl. No.: 18/879,168

(22) PCT Filed: Sep. 4, 2024

(86) PCT No.: PCT/CN2024/116951

§ 371 (c)(1),
(2) Date: Dec. 26, 2024

(87) PCT Pub. No.: WO2025/051165

PCT Pub. Date: Mar. 13, 2025

(65) Prior Publication Data

US 2025/0355233 A1      Nov. 20, 2025

Related U.S. Application Data

(60) Provisional application No. 63/580,863, filed on Sep. 6, 2023.

(51) Int. Cl.
*G02B 21/00*        (2006.01)
(52) U.S. Cl.
CPC ................................. *G02B 21/008* (2013.01)

(58) Field of Classification Search
CPC ...................................................... G02B 21/008
See application file for complete search history.

(56) References Cited

U.S. PATENT DOCUMENTS 6,356,088 B1 *   3/2002   Simon .................. G02B 21/002
                                          359/368
8,610,996 B2 *   12/2013   Krishnamachari .........................
                                          G02B 21/0032
                                          359/385

(Continued)

FOREIGN PATENT DOCUMENTS

CA      2674707 A1     2/2011
CN    101487860 A     7/2009

(Continued)

*Primary Examiner* — Mishawn N. Hunter
(74) *Attorney, Agent, or Firm* — MUNCY, GEISSLER, OLDS & LOWE, P.C.

(57)             ABSTRACT

A nonlinear laser scanning microscope with an electrical high-order modulation extraction module is provided to enhance image contrast/signal-to-noise ratio (SNR) based on first-order modulated nonlinear signals. Specifically, it uses a photodetector in the photon-to-electron conversion process. After the process, the frequency of the first-order modulation (1M) is extracted to obtain a better SNR, significantly improving the image contrast/SNR in laser scanning microscopy imaging. When the image contrast/SNR is improved to a certain extent, the image acquisition time can be shortened, and the imaging depth can be further extended, resulting in images obtained with first-order modulation (1M) having better quality than those obtained without signal modulation.

13 Claims, 7 Drawing Sheets

(56)         References Cited

U.S. PATENT DOCUMENTS

2005/0020226 A1     1/2005  Mohindra
2009/0303584 A1*  12/2009  Pacholik .............. G02B 21/002
                                                              359/385
2011/0035427 A1     2/2011  Joseph et al.

FOREIGN PATENT DOCUMENTS

CN         101626239  A      1/2010
CN         112087248  A     12/2020

* cited by examiner

LASER SCANNING MICROSCOPE WITH ELECTRICAL HIGH-ORDER MODULATION EXTRACTION MODULE

FIELD OF THE INVENTION

The present invention relates to a modulation technology for coherent/incoherent nonlinear optical microscopes (also known as coherent/incoherent nonlinear laser scanning microscopes), particularly to a laser scanning microscope with an electrical high-order modulation extraction module. The technology and system enhance image contrast/signal-to-noise ratio through the electrical high-order modulation extraction module.

BACKGROUND OF THE INVENTION

Nonlinear optical imaging is a rapidly developing optical imaging technology in recent years. It is a new tool for detecting biological structures and durable tracking markers. Based on various nonlinear optical principles, photons generate nonlinear signals at the focal point in biological samples, thus providing high three-dimensional resolution and minimal damage to biological samples. This avoids many inherent drawbacks encountered in making slices, making it an ideal method for in vivo imaging. Therefore, it has broad application prospects in biomedical research.

With the advent of nonlinear microscopy research on crystals using scanning optical microscopes by Colin Sheppard, coherent nonlinear laser scanning microscopes (C-NLSM), including second harmonic generation laser scanning microscopes (SHG-LSM), third harmonic generation laser scanning microscopes (THG-LSM), coherent anti-Stokes Raman scattering laser scanning microscopes (CARS-LSM), stimulated Raman scattering laser scanning microscopes (SRS-LSM), and incoherent nonlinear laser scanning microscopes (IC-NLSM), including two-photon fluorescence laser scanning microscopes (2PF-LSM) and three-photon fluorescence laser scanning microscopes (3PF-LSM), have become mature commercial equipment for material characterization and extensive biomedical applications. This is due to their inherent optical sectioning capability without the need for a confocal aperture, deeper imaging depth compared to traditional optical microscopy techniques, and high structural specificity provided by the interaction of polarized lasers with tissues.

To improve the image contrast/signal-to-noise ratio in C-NLSM and IC-NLSM, methods such as increasing laser power, extending image acquisition time, or using shorter pulse lasers can be employed. However, increasing laser power poses a risk of sample damage. Extending image acquisition time results in a trade-off with imaging speed. The pulse width of short-pulse lasers also has certain limitations in use.

SUMMARY OF THE INVENTION

According to the above description to solve the problem, the present invention provides a method to enhance the contrast and signal-to-noise ratio (SNR) of C-NLSM and IC-NLSM images by utilizing the first-order modulation (1M) of nonlinear signals in the frequency domain. Specifically, an electrical high-Order modulation extraction module is configured on the microscope, particularly using a down-conversion circuit or a dual-phase demodulator, to convert the 1M information component to the DC (Direct Current) frequency through a down-conversion circuit. Therefore, the primary purpose of the present invention is to align the DAQ imaging format with traditional LSM, which uses DC imaging. After the processing of the down-conversion circuit or the dual-phase demodulator, the 1M information is formed at the DC position. Thus, when the DAQ performs imaging, it uses 1M information to achieve higher contrast and SNR, shortening the image acquisition time and further extending the imaging depth.

An object of the present invention is to provide an electrical high-order modulation extraction module, used to receive the RF sinusoidal signal output by a photodetector on a laser scanning microscope with a laser scanning frequency, characterized in that the electrical high-order modulation extraction module includes: a DC blocking filter used to filter out the DC signal on the RF sinusoidal signal output by the photodetector; a function generator used to provide a local oscillation frequency, wherein the local oscillation frequency is an integer multiple of the laser scanning frequency; and a mixer having one end receives the RF sinusoidal signal output by the DC blocking filter and the other end receives the local oscillation frequency output by the function generator, and outputs an intermediate frequency signal, wherein the intermediate frequency signal is used to down-modulate the first-order or other high-order modulation (1M or HOMs) signals to the DC coordinate position, and transmit the intermediate frequency signal to a DAQ program for pixel reconstruction.

One object of the present invention is to provide an electrical high-order modulation extraction module, used to receive the RF sinusoidal signal output by a photodetector on a laser scanning microscope with a laser scanning frequency, characterized in that the electrical high-order modulation extraction module includes: a DC blocking filter used to filter out the DC signal on the RF sinusoidal signal output by the photodetector; a first splitter used to split the RF sinusoidal signal that has passed through the DC blocking filter into a first optical path and a second optical path; a function generator used to provide a local oscillation frequency, wherein the local oscillation frequency is an integer multiple of the laser scanning frequency; a second splitter used to split the local oscillation frequency into a quadrature path and an in-phase path; a first mixer, one input end of the first mixer receives the sinusoidal signal of the first optical path, and the other input end receives the quadrature path, and outputs a first intermediate frequency signal, wherein the first intermediate frequency signal is used to down-modulate the first-order modulation (1M) signal to the DC coordinate position; and a second mixer, one input end of the second mixer receives the sinusoidal signal of the second optical path, and the other input end receives the in-phase path, and outputs a second intermediate frequency signal, wherein the second intermediate frequency signal is used to down-modulate the first-order modulation (1M) signal to the DC coordinate position; and wherein the first intermediate frequency signal and the second intermediate frequency signal are transmitted to an arithmetic unit for calculation, and then the calculated root mean square signal is transmitted to a DAQ program for pixel reconstruction.

One object of the present invention is to provide a method for adjusting the imaging quality of a laser scanning microscope using an electrical high-order modulation extraction module, characterized in that it includes the following steps: providing a module manufactured by the electrical high-order modulation extraction module, and connecting the module with the laser scanning microscope and the servo terminal; obtaining and determining whether the laser repetition frequency and the LO signal frequency are the same, by obtaining the laser repetition frequency of the laser scanning microscope and the LO signal frequency generated by the function generator through the information displayed on the servo terminal, and determining whether the LO signal frequency is a multiple of the laser repetition frequency; correcting the LO signal frequency, by adjusting the LO signal frequency output by the function generator through the servo terminal when the LO signal frequency is not a multiple of the laser repetition frequency, so that the LO signal frequency is a multiple of the laser repetition frequency; providing a high-order modulation signal, by obtaining a down-modulated high-order modulation signal through the calculation of the module, and transmitting the down-modulated high-order modulation signal to the DAQ program configured in the servo terminal for pixel reconstruction; and adjusting the imaging quality, by the observer sequentially selecting a down-modulated signal (1M, 2M, 3M, . . . ), and transmitting the down-modulated signal to the DAQ, and the DAQ program sequentially performing pixel reconstruction.

According to the above objective, the present invention extracts the first-order modulation (1M) frequency to achieve better signal-to-noise ratio (SNR), thereby significantly improving the image contrast and SNR in laser scanning microscope imaging. When the image contrast and SNR are sufficiently improved, the image acquisition time can be shortened, and the imaging depth can be further extended, resulting in higher quality images obtained using first-order modulation (1M) compared to images obtained without signal modulation.

DETAILED DESCRIPTION OF THE PREFERRED EMBODIMENT

The present invention is described in detail below in conjunction with embodiments. Those skilled in the art will easily understand other advantages and features of the present invention after reading this disclosure. However, the present invention can also be implemented or applied in other embodiments, and various details in this description may be modified and altered from different perspectives and based on different applications without departing from the spirit of the present invention. Furthermore, in the following description, the present invention will use abbreviated English letters in place of specific terms, such as: 1M for first-order modulation, NLSM for nonlinear laser scanning microscope, C-NLSM for coherent nonlinear laser scanning microscope, IC-NLSM for incoherent nonlinear laser scanning microscope, DAQ for data acquisition card, HOM for higher-order modulation, DCBR for direct current blocking filter, TLPF for tunable low-pass filter, PD for photodetector, PMT for high-speed photomultiplier tube, PDT (pixel dwell time) for image dwell time, SHG for second-harmonic generation, and SNR for signal-to-noise ratio.

Figure 1:
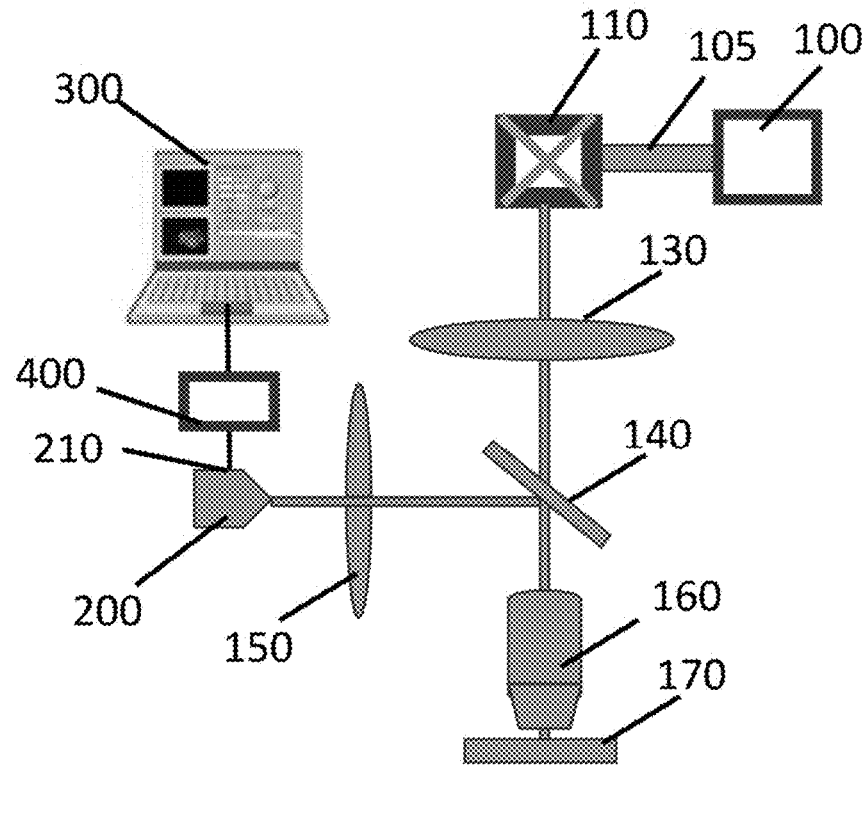
FIG. 1 is a schematic diagram of a commercial nonlinear scanning microscope (NLSM).

First, please refer to FIG. 1, which is a schematic diagram of a laser scanning microscope (LSM). As shown in FIG. 1, the LSM includes a laser device 100 for providing a laser light source 105. A scanning mirror 110 is used to form a light scanning signal from the laser light source 105. A tube lens 130 is used in conjunction with an objective lens 160, together correcting the aberrations of the objective lens very effectively. A dichroic beam splitter group 140 allows the scanning light to pass through the objective lens 160 and generates nonlinear signals from the sample, which are reflected or scattered to a high-speed photodetector (PD) 200. A focusing lens group 150, which is a smooth-surfaced condensing lens structure, particularly a single-piece composite Fresnel lens, focuses the reflected light from the sample onto PD 200. An objective lens 160 focuses the light that has passed through the tube lens 130 onto a sample on the sample holder 170. A high-speed photodetector (PD) 200 converts the light signal passing through the focusing lens group 150 into an electrical signal, where the photodetector (PD) 200 can be a high-speed photomultiplier tube (PMT) or an avalanche photodiode (APD), and the invention is not limited in this regard. An electrical high-order modulation extraction module 400/500 processes the electrical signals generated by PD 200 through a down-conversion circuit or dual-phase demodulator, providing a sample image signal with first-order modulation (1M) formed at the direct current (DC) position. A servo device 300 receives the first-order modulation (1M) signal transmitted by the photodetector (PD) 200 and uses a data acquisition card (DAQ) in the imaging program of the servo device 300 to piece together the image signal with the scanning signal point by point to form an image. In the imaging embodiment using the laser scanning microscope (LSM) in the present invention, the laser device 100 is a sapphire laser device with a pulse width of 140 $f_S$ and a repetition rate of approximately 80.2 MHz. Furthermore, the photodetector (PD) 200 converts the non-linear photons into electrical signals and collects the weak SHG signals, where this electrical signal is a radio frequency (RF) sinusoidal signal.

Figure 2:
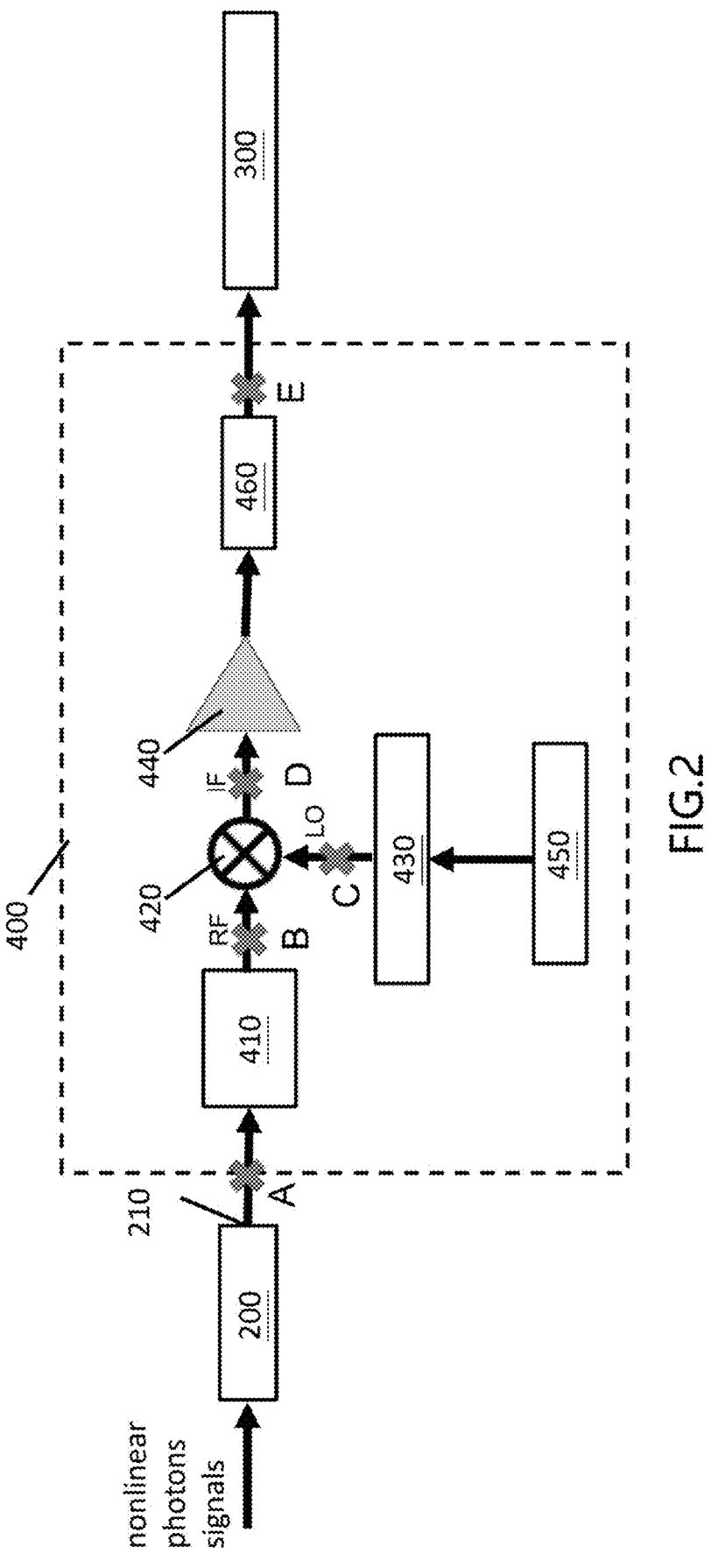
FIG. 2 is a structural schematic diagram of the electrical high-order modulation extraction module of the present invention.

Next, please refer to FIG. 2 and FIG. 3, where FIG. 2 is a schematic diagram of the electrical high-order modulation extraction module of the present invention, and FIG. 3 shows the electrical signals at various nodes corresponding to FIG. 2. As shown in FIG. 2, the electrical high-order modulation extraction module 400 receives the electrical signals transmitted from the photodetector (PD) 200, where each sampling frequency (0, $f_S$, $2f_S$, . . . ) in the electrical signal contains spatial information of the same sample. In other words, the photodetector (PD) 200 can simultaneously collect DC, 1M, 2M, and 3M, as well as higher-order modulation (HOM). The output signal of the photodetector (PD) 200 is at point A in FIG. 2, and the corresponding signal at point A is shown in FIG. 3*a*. Additionally, in the present invention, 1M, 2M, and 3M (collectively referred to as higher-order modulation) refer to several times the laser repetition rate. For example, when the laser emits 50 million pulses per second, it indicates a laser repetition rate of 50 MHz, so the center frequency of 0M is 0 Hz, the center frequency of 1M is 50 MHz, the center frequency of 2M is 100 MHz, and the center frequency of 3M is 150 MHz, etc. At this point, if the bandwidth limit of the photodetector (PD) 200 is 80 MHz, then the aforementioned 0M and 1M signals can be fully detected, while the 2M and 3M signals will be significantly attenuated, so in terms of signal, 1M is the best, as first shown in FIG. 4*c*.

Figure 3A:
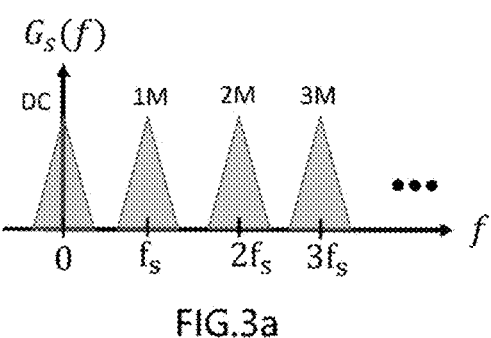
FIG. 3a shows the signal at position A in FIG. 2 of the present invention.
Figure 3B:
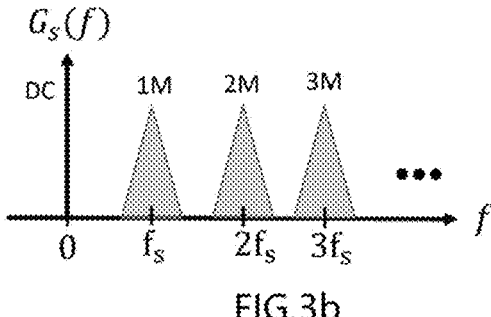
FIG. 3b shows the signal at position B in FIG. 2 of the present invention.
Figure 3C:
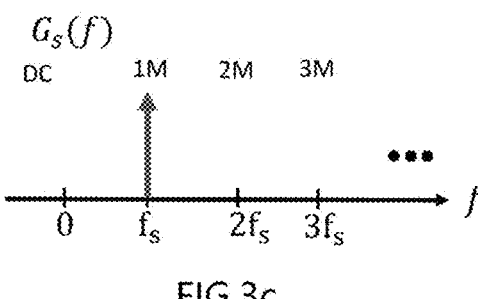
FIG. 3c shows the signal at position C in FIG. 2 of the present invention.
Figure 3D:
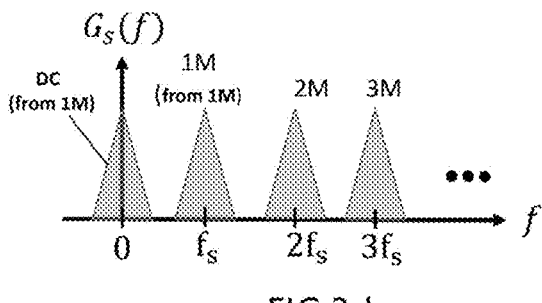
FIG. 3d shows the signal at position D in FIG. 2 of the present invention.

Next, the electrical high-order modulation extraction module 400 includes: a DC block filter (DCBF) 410 to filter out the DC signal from the RF sinusoidal signal output by the photodetector (PD) 200, where DCBF 410 is a bandpass filter with a range of 50 MHz to 26.5 GHz used to remove the DC signal, so the corresponding signal at point B in FIG. 2 is shown in FIG. 3*b*. An RF mixer 420 is connected to receive the RF sinusoidal signal (i.e., FIG. 3*b*) output by DCBF 410 at one end. A function generator 450 provides a local oscillation (LO) signal, for example: generating a single adjustable output frequency from 250 kHz to 4 GHz or a laser pulse, and this LO signal is at point C in FIG. 2, with the corresponding signal shown in FIG. 3*c*. After the LO signal is provided to the other input end of RF mixer 420, RF mixer 420 outputs an intermediate frequency (IF) signal, which is at point D in FIG. 2, and the corresponding signal at point D is shown in FIG. 3*d*. This IF signal is the sum and difference frequency of the RF sinusoidal signal and the LO signal, and at the same time, this IF signal is proportional to the product of the RF sinusoidal signal and the LO signal. For example, when the frequency of the LO signal equals the laser pulse repetition frequency (as shown in FIG. 3*c*), after passing through mixer 420, the first-order modulation (1M) signal can be down-modulated to the DC coordinate position, as shown in FIG. 3*d*, indicating that the first-order modulation (1M) signal can be selected for imaging in LSM. It should be particularly noted that since the output frequency of the LO signal at point C in FIG. 2 can be an integer multiple of the laser pulse repetition frequency, specific higher-order modulations (HOM) can be selected for imaging, such as 1M, 2M, 3M, or other higher-order modulations, as indicated at point D in FIG. 2. In principle, by sequentially changing the frequency of the LO signal, pixels from different modulation orders can be obtained until the bandwidth of the LO signal or mixer is saturated. Clearly, in the embodiment of the present invention, the LO signal frequency from the function generator 450 can be selected as an integer multiple of the laser pulse repetition frequency; therefore, the function generator 450 can provide various frequencies for higher-order modulation. Moreover, after generating the LO signal from the function generator 450, it can optionally pass through a phase shifter (Phase Shifter) 430 to shift the relative phase angle between the LO signal and the RF signal by a set angle. For example, setting phase shifter 430 as a 90-degree displacer will convert the sine wave into a cosine wave.

In the aforementioned electrical high-order modulation extraction module 400, it can further include: an amplifier 440 and a tunable low-pass filter (Tunable-LPF) 460. Once the LO signal frequency is determined, it is used to filter out certain IF frequencies at the D point. For example, when the frequency of the LO signal equals the laser pulse repetition frequency, the T-LPF 460 will filter out IF frequencies exceeding the laser pulse repetition frequency, leaving only the first-order modulation (1M) signal at the frequency of 0 (i.e., DC), as shown at point E in FIG. 2. If the frequency of the LO signal is twice the laser pulse repetition frequency, the T-LPF 460 will filter out IF frequencies other than 2M, leaving only the second-order modulation (2M) signal at the DC coordinate position. Finally, either the first-order modulation (1M) signal or other modulation signals will be sent to the DAQ in the servo terminal 300 for pixel reconstruction through the DAQ program.

Figure 4A:
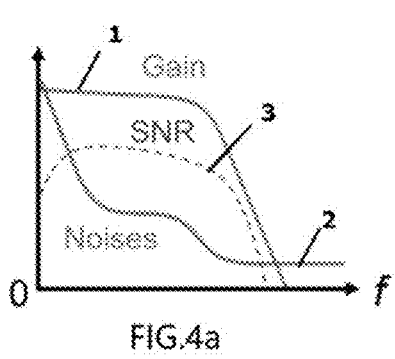
FIG. 4a is a schematic diagram showing how the photodetector in the present invention converts photons into electrical signals with frequency response.

Next, please refer to FIG. 4, which illustrates the working principle of the pixel contrast/signal-to-noise ratio enhancement mechanism used in the present invention. This principle applies to both coherent and non-coherent nonlinear microscopy. As shown in FIG. 4*a*, it is a schematic representation of the photodetector (PD) 200 converting photons into an electrical signal with frequency response. The curve labeled 1 indicates the gain of the photodetector (PD) 200 converting photons into electrons, the curve labeled 2 indicates the noise of the photodetector (PD) 200 converting photons into electrons, and the curve labeled 3 indicates the frequency response of the signal-to-noise ratio of the photodetector (PD) 200 converting photons into electrons.

Figure 4B:
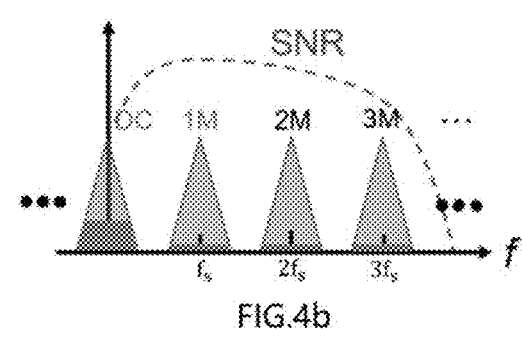
FIG. 4b is a schematic diagram showing the output electrical signal from the photodetector after multiplying the signal-to-noise ratio curve of the photoelectric conversion signal in FIG. 4a with the different orders of incident light.

Next, in FIG. 4*b*, due to the inherent noise characteristics of the mode-locked laser, the different orders (DC, 1M, 2M, 3M . . . ) of optical signals (represented in light color at the top of the signal waveform) carry different optical noise (represented in dark color at the bottom of the signal waveform). The noise carried by the DC optical signal is much greater than that of the 1M, 2M, 3M signals, and in FIG. 4*b*, the photonic conversion signal noise ratio curve indicated by 3 in FIG. 4*a*, when multiplied with the different orders (DC, 1M, 2M, 3M . . . ) of incident light, produces the electrical signal output from the photodetector (PD) 200.

Figure 3E:
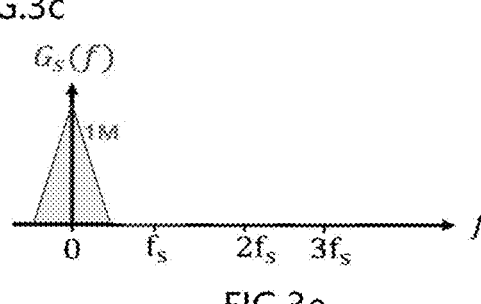
FIG. 3e shows the signal at position E in FIG. 2 of the present invention.
Figure 4C:
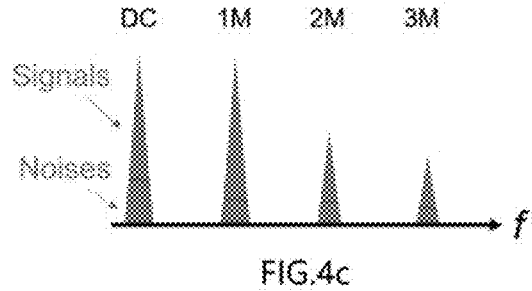
FIG. 4c is a schematic diagram of the product of frequency domain electrical signals and signal-to-noise ratio at different orders in the present invention.

Furthermore, as shown in FIG. 4*c*, the conversion electrical signals of different orders (DC, 1M, 2M, 3M . . . ) that can be used for imaging are clearly the product of the frequency domain electrical signals of different orders and the signal-to-noise ratio. Among them, the imaging electrical signal includes noise background (lower part) and signal (upper part). It should be noted that the higher the order of the conversion electrical signal, the smaller it becomes. Therefore, in order to utilize the optimal performance during the photon-electron conversion process and obtain a higher signal-to-noise ratio, it is crucial to select the most suitable electrical signal modulation order for the DAQ circuit in the microscope. For example, in the embodiment of the present invention, the first-order modulation (1M) electrical signal can be chosen as the imaging electrical signal, which can achieve the best signal-to-noise ratio. It is worth noting that traditional LSM uses DC imaging, and to maintain consistency with the traditional LSM in the DAQ imaging format, the present invention processes the 1M modulation information to form at the DC position through the down-conversion circuit 400 or dual-phase demodulator circuit 500, as shown in FIG. 3d or FIG. 3e. Thus, when DAQ imaging is performed, it utilizes the information of the first-order modulation (1M), which has higher image contrast/signal-to-noise ratio for imaging. Since the DAQ employs an imaging program to combine the image signals with scanning signals point by point to form an image, enhancing image contrast or reducing the signal-to-noise ratio is key to assessing imaging effectiveness. In the preferred embodiment of this present invention, techniques are employed to enhance image contrast by down-modulating the first-order modulation (1M) information to the DC position, achieving relatively better image contrast and improving the ratio of image contrast to signal-to-noise ratio.

It is evident that the converted signal passing through point B in FIG. 2 (i.e., with lower noise) may not have sufficient intensity on its own to be delivered to subsequent data reception. Therefore, an additional amplifier is required to amplify the converted signal. Next, one can choose to have the amplified converted signal pass through a low-frequency filter, which can filter out the extra noise after amplification. As a result, the converted signal at point E provided to the DAQ can enhance the ratio of image contrast to signal-to-noise ratio.

Next, we analyze imaging of a real sample using a nonlinear laser scanning microscope (NSLM) configured with an electrical high-order modulation extraction module, to illustrate the effect of this present invention using high-order modulation (HOM) technology to improve the ratio of image contrast to signal-to-noise ratio.

The imaging tissue sample in the present invention is selected from tangled muscle collagen tissue extracted from mice. Please refer to FIG. 5, which shows a matrix of SHG tissue imaging with different orders (electrical) of modulation, PDT, and TLPF bandwidth. This imaging matrix is constructed with different PDTs (0.4 μs, 1 μs, and 5 μs) and modulation orders (1M-3M) as well as DC in the preferred embodiment of the present invention. All images share the same color scale and dynamic range, where the scale bar is 100 μm.

Figure 5:
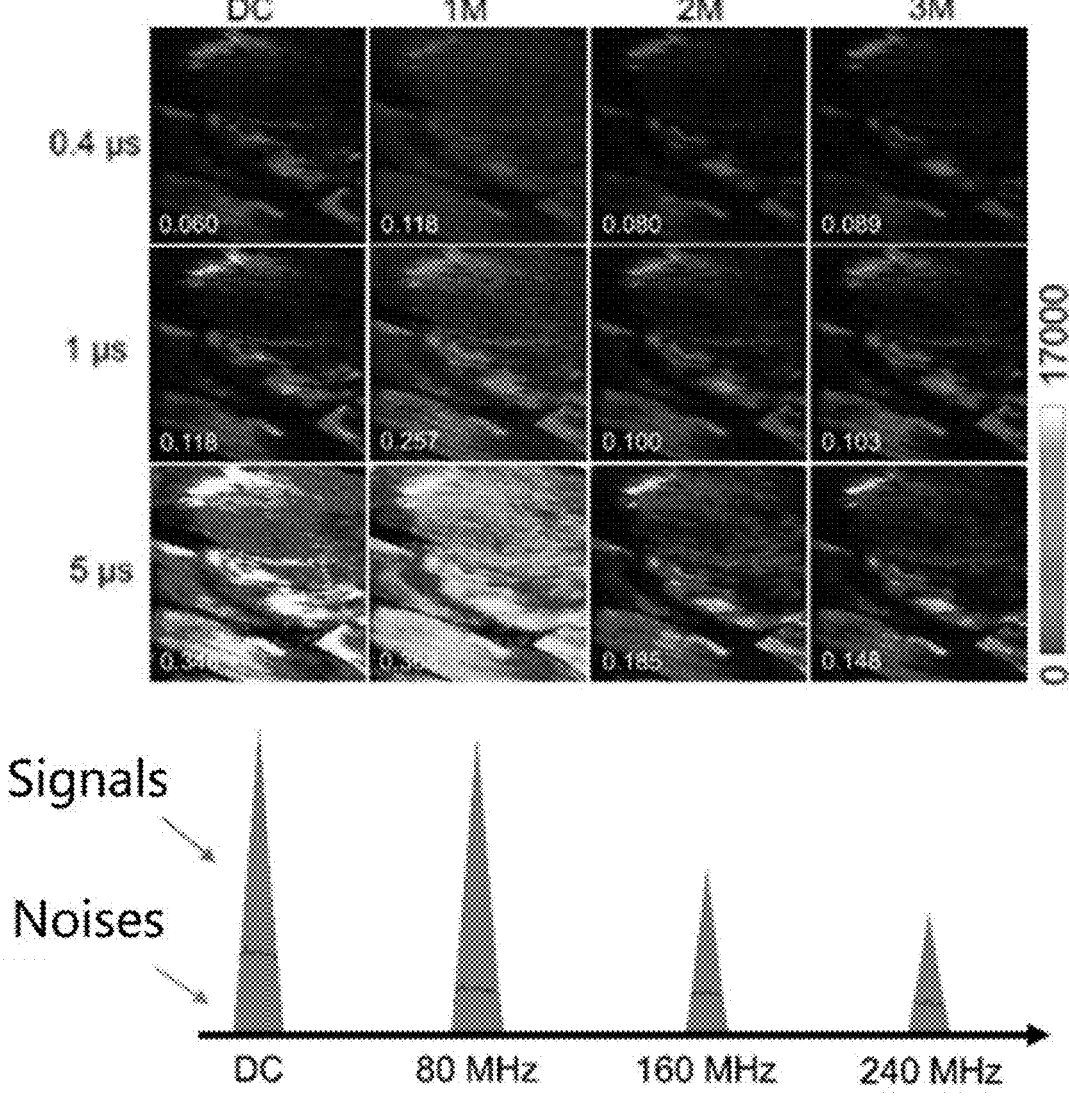
FIG. 5 is a schematic diagram of contrast and imaging speed in the present invention.

As shown in FIG. 5, it displays the SHG modulation signals with different PDTs in imaging matrices under various modulation orders. In the present invention, it is clearly understood that the 1M signal (sampling frequency of 80 MHz) provides the best image contrast, and the corresponding images of different modulation orders shown in FIG. 2(f) are arranged below FIG. 5. The dynamic range of FIG. 5 is standardized within a range of 0-17000. It is clear that in each column of FIG. 5, the image contrast increases with the increase of PDT. Additionally, from each row of FIG. 5, it can be observed that regardless of the PDT, images obtained from 1M show better image contrast than those obtained from DC and HOM (N=2, 3). The results displayed in the image matrix of FIG. 5 demonstrate the consistency of the working principle that optimizing high modulation orders can enhance image quality. At the same time, it can also be seen from FIG. 5 that as the scanning slows down, the image contrast increases, resulting in clearer images.

The present invention has successfully demonstrated that the first-order modulation (1M) frequency extracted by the electrical high-order modulation extraction module 400 can significantly improve image quality. Furthermore, to enable the electrical high-order modulation extraction module to also be applied to the processing of silver light signals or imaging of other subtle surfaces, such as in imaging detection used in industrial processes, there is an urgent need for the electrical high-order modulation extraction module to simultaneously handle non-coherent light signals. Next, the present invention will further disclose an electrical high-order modulation extraction module with coherent/non-coherent light signals.

Figure 6:
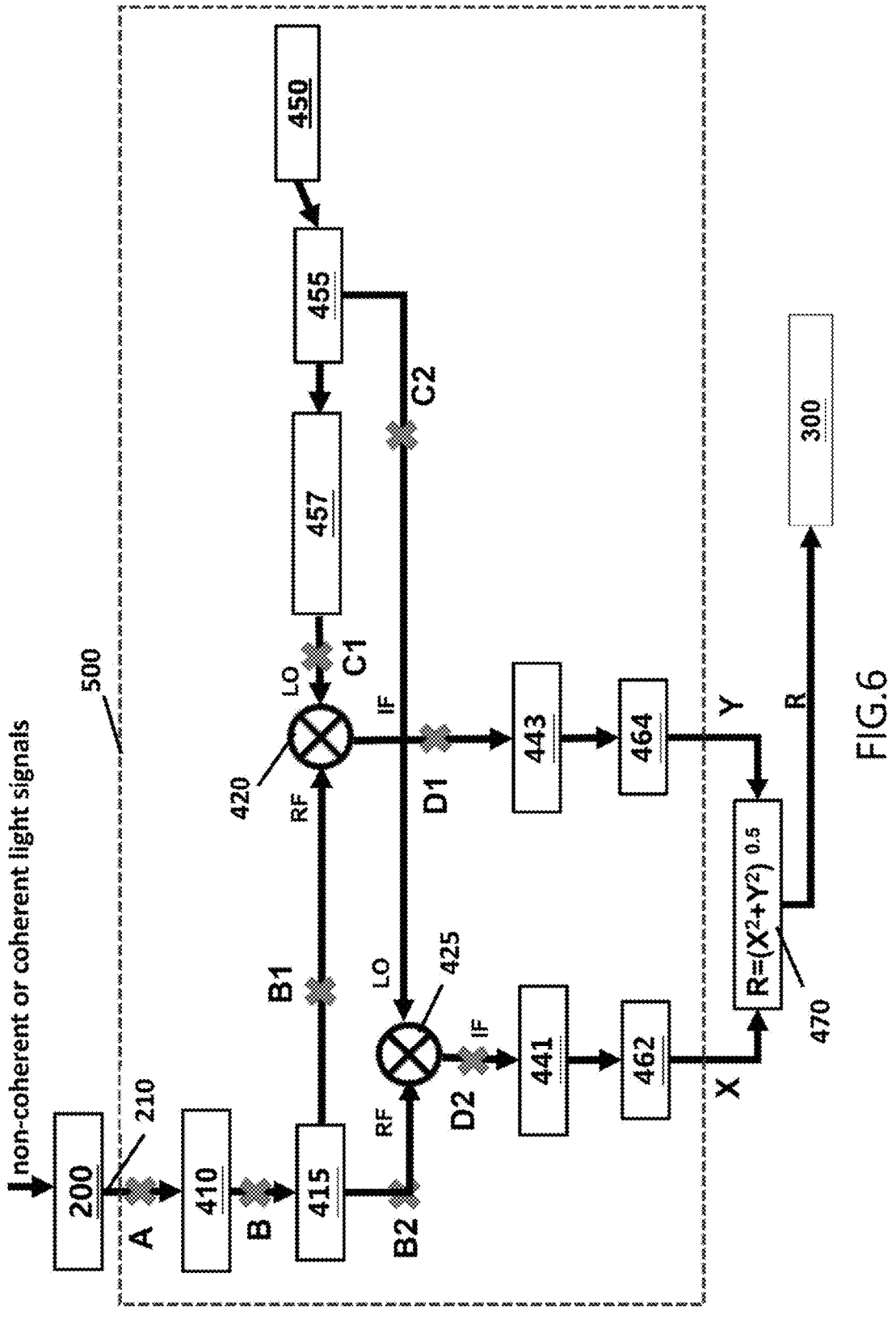
FIG. 6 is a structural schematic diagram of another embodiment of the electrical high-order modulation extraction module of the present invention.

Next, please refer to FIG. 6, which is a schematic diagram of another embodiment of the electrical high-order modulation extraction module of the present invention invention. As shown in FIG. 6, the electrical high-order modulation extraction module 500 can be a dual-phase demodulator. When the photodetector (PD) 200 receives non-coherent or coherent light signals, for example: a type of fluorescence or harmonic generation, it converts the coherent and non-coherent light signals into various electrical signals with modulated sinusoidal waves. The frequency of the sinusoidal waves in the electrical signal is the same as the laser repetition rate or its multiples, and the modulated electrical signal contains spatial information about the same sample. In other words, the photodetector (PD) 200 can simultaneously collect DC, 1M, 2M, 3M, and other higher-order modulations (HOM). Furthermore, the electrical high-order modulation extraction module 500 receives and extracts a set of high-order modulated electrical signals (1M or 2M or 3M) sent from the photodetector (PD) 200, where the output signal from the photodetector (PD) 200 is at point A in FIG. 6, and the corresponding signal at point A is shown in FIG. 3a.

Next, the electrical high-order modulation extraction module 500 includes: a direct current blocking filter (DCBF) 410, used to filter out the direct current signal and its modulated signal from the radio frequency (RF) sine wave signal output by the photodetector (PD) 200, allowing signals of 1M, 2M, 3M, and other higher-order modulations (HOM) to pass through simultaneously. The DCBF 410 can also be replaced with a suitable band-pass filter (BPF), which not only filters out the direct current signal and its modulated signal but also selectively passes either 1M, 2M, 3M, or other higher-order modulations (HOM). After passing through the DCBF 410, the modulated signal is sent through a splitter 415, which can separate the signals of 1M, 2M, 3M, and other higher-order modulations (HOM) into two optical paths (B1, B2), where the corresponding signals of B1 and B2 are shown in FIG. 3b. Subsequently, the B1 optical path transmits the B1 signal to the receiving end of the first RF mixer 420, while the B2 optical path transmits the B2 signal to the receiving end of the second RF mixer 425. In this embodiment of the present invention, both B1 and B2 signals are A sin(2πfst+θ), where A is the amplitude, $f_S$ is the sampling frequency, which corresponds to the carrier frequencies of 1M, 2M, 3M, or other higher-order modulations (HOM) and is also an integer multiple of the laser repetition rate.

A sinusoidal signal generator 450 is used to provide a local oscillator (LO) signal, with the frequency of this sinusoidal signal equal to the laser repetition frequency or its harmonics, used to select whether to use 1M, 2M, 3M, or other higher-order modulations (HOM) for nonlinear microscope imaging. The LO signal can be generated using a simple electrical signal generator or by using the femtosecond laser 100 from FIG. 1, which extracts a small portion of the generated femtosecond pulse laser light and directs it to a photodetector, converting it into an electrical pulse signal, along with an appropriate band-pass filter (BPF) to select the generated signal. The LO signal passes through a splitter 455, which separates the LO signal into two optical paths (C1, C2), where the C1 optical path goes through a phase shifter 457. When the phase shifter 457 is set to a 90-degree displacement, it converts the sine wave into an orthogonal cosine wave signal. The corresponding LO signal in the C1 optical path is shown in FIG. 3c. The C2 optical path has a co-phased sine wave signal. In this embodiment of the present invention, the C1 signal is B cos($2\pi$frt), where B is the amplitude and fr is the pulse center frequency. The C2 signal is B sin($2\pi$frt), where B is the amplitude and fr is the pulse center frequency.

One input of the first RF mixer 420 receives the sinusoidal signal from the B1 optical path, for example: a sine wave signal, while the other input of the first RF mixer 420 receives the sinusoidal signal from the C1 optical path, for example: a cosine wave signal. Then, after processing through the first RF mixer 420, a first intermediate frequency (IF) signal is output, located at point D1 in FIG. 6, and the corresponding signal at point D1 is shown in FIG. 3d. The first IF signal is the sum and difference frequency of the RF sinusoidal signal and the LO signal, and this first IF signal is proportional to the product of the RF sinusoidal signal and the LO signal. For example, when the frequency of the LO signal equals the repetition frequency of the laser pulse (as shown in FIG. 3c), it indicates that after passing through the first mixer 420, the first-order modulation (1M) signal can be down-modulated to the DC coordinate position, as shown in FIG. 3d, indicating that this first-order modulation (1M) signal can be selected for imaging in LSM. It should be particularly noted that since the output frequency of the LO signal in FIG. 6 can be an integer multiple of the laser pulse repetition frequency, specific HOMs can be selected for imaging, such as: 1M, 2M, 3M, or other higher-order modulations (HOM).

One input of the second RF mixer 425 receives the sinusoidal signal from the B2 optical path, for example: a sine wave signal, while the other input of the second RF mixer 425 receives the sinusoidal signal from the C2 optical path, for example: another sine wave signal. Subsequently, the second RF mixer 425 will output a second intermediate frequency (IF) signal, located at point D2 in FIG. 6, and the corresponding signal at point D2 is shown in FIG. 3d. The second IF signal is the sum and difference frequency of the RF sinusoidal signal and the LO signal, and this second IF signal is also proportional to the product of the RF sinusoidal signal and the LO signal. For example, when the frequency of the LO signal equals the laser pulse repetition frequency (as shown in FIG. 3c), it indicates that after passing through the second mixer 425, the first-order modulation (1M) signal can be down-modulated to the DC coordinate position, as shown in FIG. 3d, indicating that this first-order modulation (1M) signal can be selected for imaging in LSM. It should be particularly noted that since the output frequency of the LO signal in FIG. 6 can be an integer multiple of the laser pulse repetition frequency, specific HOMs can be selected for imaging, such as: 1M, 2M, 3M, or other higher-order modulations (HOM).

Next, the signals at points D1 and D2 are processed through LPF 462 and LPF 464, respectively, to filter out the IF frequencies that are down-modulated to the DC coordinate position. After that, the two filtered signals X and Y are transmitted to the calculator 470 for computation to obtain a signal R, where R=$(X^2+Y^2)^{0.5}$. The calculator 470 can utilize hardware circuits or software programs to perform the calculations. In an optimal embodiment, the calculator

470 can be configured in the servo terminal 300, calculating the R signal through a DAQ program. For example, when the frequency of the LO signal equals the laser pulse repetition frequency, i.e., when $f_S$=fr, LPF 462 and LPF 464 will filter out IF frequencies exceeding the laser pulse repetition frequency, leaving only the first-order modulation (1M) signal at the frequency of 0 (i.e., DC). At this point, the signals at positions X and Y in FIG. 6 are as shown in FIG. 3d. The signal at position X is $$X = \frac{AB}{2}\cos\,\theta;$$

the signal at position Y is $$Y = \frac{AB}{2}\sin\,\theta,$$

where $\theta$ is the phase difference between the laser and the nonlinear signal. Finally, a signal R=$(X^2+Y^2)^{0.5}$ is calculated by the calculator 470 and subjected to pixel reconstruction through the DAQ program.

The coherent nonlinear signals can be extracted using the down-conversion circuit from FIG. 2 or the dual-phase demodulator circuit from FIG. 6 to obtain signals with better signal-to-noise ratios for 1M, 2M, 3M, or other higher-order modulations (HOM). In the case of incoherent nonlinear signals, since $\theta$ is the phase difference between the laser and the nonlinear signal, it varies over time and space, unlike the coherent nonlinear signals where $\theta$ is a fixed value, which can be compensated for using the fixed phase shifter 430 in FIG. 2. Therefore, the circuit in FIG. 6 and the calculation of the R=$(X^2+Y^2)^{0.5}$ signal are needed to extract the true amplitude of the nonlinear signal.

Figure 7:
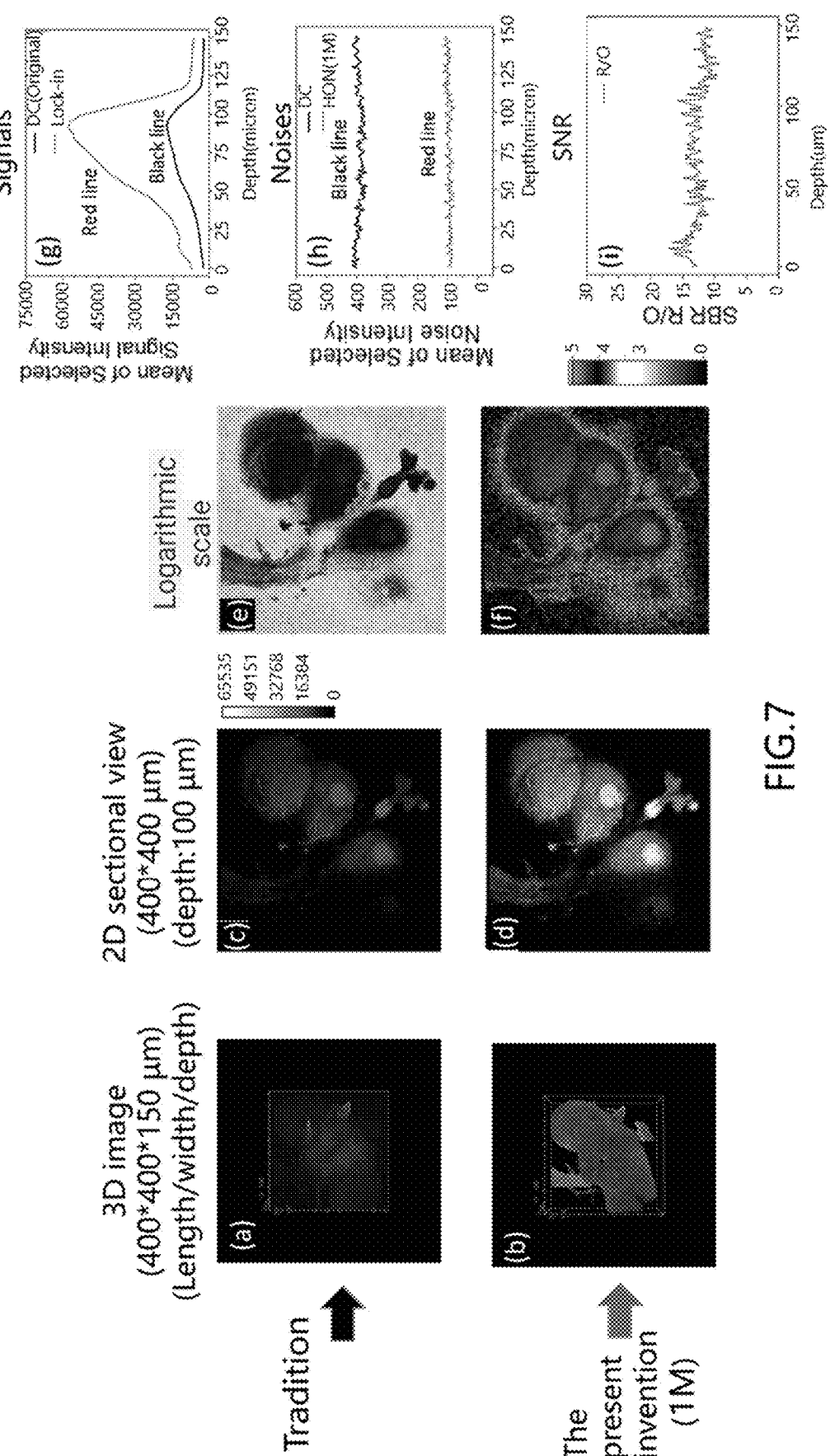
FIG. 7 is a schematic diagram of the 3D two-photon fluorescence image in the nonlinear microscope of the present invention.

Finally, referring to FIG. 7, it illustrates the 3D two-photon fluorescence image of the nonlinear microscope of the present invention. As shown in FIG. 7, using the implementation of the R=$(X^2+Y^2)^{0.5}$ signal, the LSM achieves the following imaging effects. For example, the original 3D two-photon fluorescence image from the nonlinear microscope (using DC signals) is shown in (a) of FIG. 7, while the 3D two-photon fluorescence image obtained from the 1M signal extracted by the dual-phase demodulator circuit in FIG. 6 is shown in (b) of FIG. 7. At a depth of 100 μm, the original (DC) 2D slice image is shown in (c) and (e) of FIG. 7, while the 2D slice image at a depth of 100 μm extracted from the 1M signal using the circuit in FIG. 6 is shown in (d) and (f) of FIG. 7. Among them, (c) and (d) of FIG. 7 are plotted using a linear scale, and it can be observed that after passing through the circuit in FIG. 6, the signal is enhanced by about 3-4 times. To demonstrate the reduction of image noise by the present method, (e) and (f) of FIG. 7 are taken in log scale, with image noise represented in grayscale. It is evident that using the 1M high-order modulation results in a significant reduction in overall noise by about 3-4 times. The black and red lines in (f) and (h) of FIG. 7 represent the signal enhancement and noise reduction of the original microscope (DC, black line) and the method used (1M, red line) at different imaging depths. According to the signal enhancement ratio shown in (f) of FIG. 7 and the noise reduction ratio shown in (h) of FIG. 7, (i) of FIG. 7 displays that the signal-to-noise ratio of all depths in the two-photon fluorescence microscope has increased by approximately an order of magnitude (10 times or more).

The electrical high-order modulation extraction module 500 of the present invention, which possesses coherent/incoherent optical signals, has the capability to simultaneously process incoherent optical signals to extract the first-order modulation (1M) signal. Therefore, when the electrical high-order modulation extraction module 500 utilizes the extracted first-order modulation (1M) signal as LSM imaging information, a significant improvement in image quality can be achieved, enabling the application of the electrical high-order modulation extraction module 500 to fluorescence signal processing or imaging of other fine surfaces.

Figure 8A:
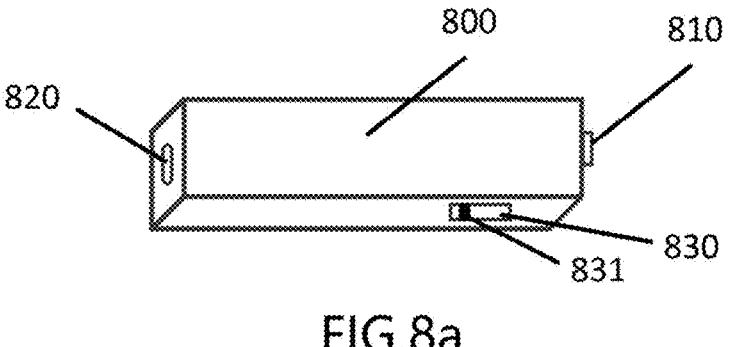
FIG. 8a is a three-dimensional schematic diagram of the electrical high-order modulation extraction module product of the present invention.
Figure 8B:
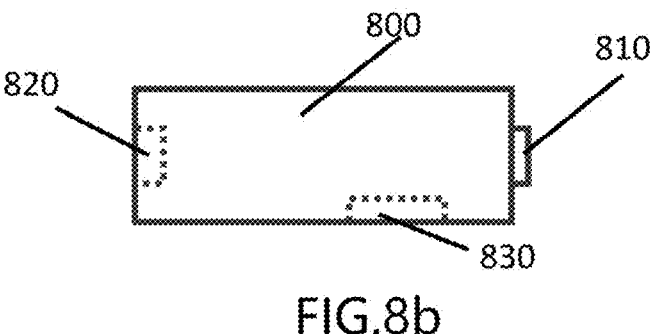
FIG. 8b is a side view schematic diagram of the electrical high-order modulation extraction module product of the present invention.

Next, please refer to FIG. 8, which is a schematic diagram of a product with an electrical high-order modulation extraction module according to the present invention. FIG. 8*a* shows a three-dimensional schematic of the electrical high-order modulation extraction module, while FIG. 8*b* shows a top view of the electrical high-order modulation extraction module. As shown in FIG. 8*a*, the down-conversion circuit from FIG. 2 and the dual-phase demodulator from FIG. 6 are fabricated on a circuit board (not shown in the figure) and are arranged within a geometric-shaped module 800 to form a portable module 800 product. Among them, one connection terminal 820 on the module 800's casing can be connected to the electrical signal of the photodetector (PD) 200 to transmit the electrical signal to the DC block filter (DCBF) 410. Another connection terminal 810 on the module 800's casing can connect to the servo terminal 300 to transmit the first-order modulation (1M) signal to the DAQ program within the servo terminal 300 for pixel reconstruction. Additionally, a band switch 830 is further arranged on the module 800's casing. This band switch 830 is connected to the function generator 450 in FIG. 2 and FIG. 6, allowing for the adjustment of the LO signal output by the function generator 450 through the band switch 830. The LO signal provides a sinusoidal signal that matches or is a multiple of the laser repetition frequency. The adjusted LO signal is then combined with the electrical signal from the photodetector (PD) 200 through the RF mixer 420 to extract 1M, 2M, 3M, or other high-order modulations (HOM) as imaging signals. For example, when the laser repetition frequency is 50 MHz, the LO signal is adjusted to be near 50 MHz, enabling the complete extraction of the 1M signal from the photodetector (PD) 200 with an 80 MHz bandwidth, which serves as the imaging signal for the DAQ. It is evident that when different LSMs use different photodetectors (PD) 200, although the photodetectors (PD) 200 may have different bandwidths, the corresponding laser repetition frequency can be adjusted using the band switch 830 of the present invention without limitation.

When the module 800 produced by the electrical high-order modulation extraction module of the present invention is connected to an LSM, it is possible to choose to connect either the connection terminal 810 or the connection terminal 820 to the servo terminal 300 or the electrical signal of the photodetector (PD) 200, while the other terminal completes the closed-loop connection through a wire. For example, when the connection terminal 810 on the module 800 is connected to the servo terminal 300, a wire can be used to connect connection terminal 820 to the electrical signal terminal 210 of the photodetector (PD) 200. Of course, in another embodiment, it is also possible to use two wires for connecting the module 800 to the LSM and the servo terminal 300, where one wire connects the connection terminal 810 to the servo terminal 300, and the other wire connects the connection terminal 820 to the photodetector (PD) 200. The method used to connect the module 800 to the LSM is not limited by the present invention but is primarily based on user convenience.

Figure 9:
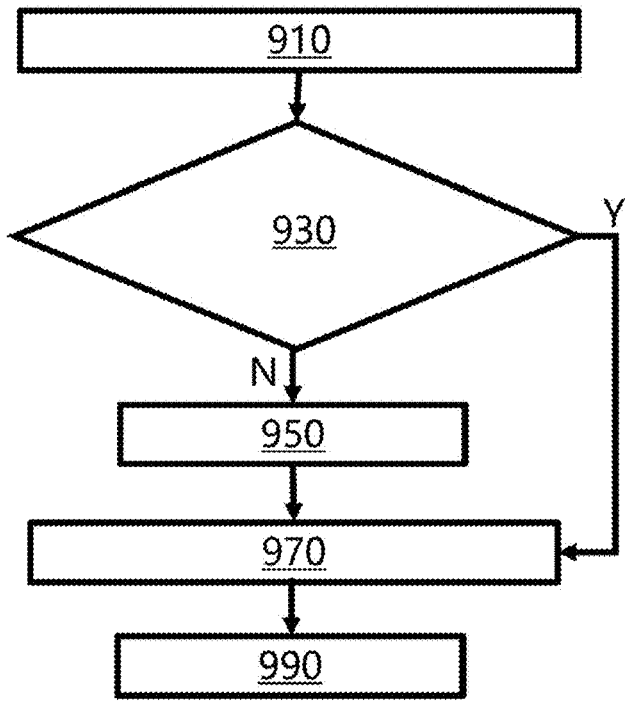
FIG. 9 is a flowchart of the imaging process using the electrical high-order modulation extraction module of the present invention.

Clearly, when the module 800 produced by the electrical high-order modulation extraction module of the present invention is connected to the LSM and the servo terminal 300, the following steps must be followed. As shown in FIG. 9, this is the flow of obtaining imaging using the electrical high-order modulation extraction module of the present invention with module 800. This is essential for achieving better imaging. The LSM imaging operation include the following steps.

Step 910: Connect the module 800 produced by the electrical high-order modulation extraction module with the LSM and the servo terminal 300.

Step 930: Obtain the laser repetition frequency and the LO signal frequency, and determine whether the LO signal frequency is a multiple of the laser repetition frequency by checking the information displayed on the servo terminal 300, thereby obtaining the LSM's laser repetition frequency and the LO signal frequency from the function generator 450. Afterward, determine whether the LO signal frequency is a multiple of the laser repetition frequency, where the determination method can be confirmed by the user; the present invention does not impose restrictions on the determination method.

Step 950: Calibrate the LO signal frequency of the function generator 450. When the LO signal frequency of the function generator 450 does not match the laser repetition frequency, the LO signal frequency is adjusted through the servo terminal 300 so that it matches the laser repetition frequency or is a multiple of the laser repetition frequency. The method for adjusting the LO signal frequency can be defined by the user; the present invention does not impose restrictions on the calibration method.

Step 970: Provide the high-order modulation signal to the DAQ. When the LO signal frequency of the function generator 450 is a multiple of the laser pulse repetition frequency, the module 800 produced by the electrical high-order modulation extraction module completes the computation to obtain the down-modulated high-order modulation signal. Subsequently, the down-modulated high-order modulation signal is transmitted to the DAQ program configured within the servo terminal, where the program combines the imaging signal with the scanning signal point by point to form an image.

Step 990: Adjust the imaging quality. This is done by the observer adjusting the button 831 on the band switch 830 to select the LO signal frequency, which corresponds to a down-modulated signal (1M, 2M, 3M, . . . ), and transmits the down-modulated signal to the DAQ for imaging.

Therefore, through the above methods, the present invention allows the server 300 to view the imaging results of each down-modulated signal (1M, 2M, 3M, . . . ) and obtain the best possible imaging output on the server 300's display.

According to the above, the laser scanning microscope equipped with the electrical high-order modulation extraction module provided by the present invention can achieve the following advantages. (1) The electrical high-order modulation extraction module has a simple structure, facilitating adaptation to other forms of coherent or incoherent nonlinear optical imaging techniques, such as third harmonic generation (THG), coherent anti-Stokes Raman scattering (CARS), stimulated Raman scattering (SRS) microscopy, two-photon fluorescence microscopy (2PF), and three-photon fluorescence microscopy (3PF). (2) The configuration of the electrical high-order modulation extraction module processes the electrical signal only at the detection end, thereby providing many possibilities for combining existing contrast enhancement methods, such as using near-infrared wavelengths to reduce light scattering in tissues, immersing the sample in clearing agents, and utilizing adaptive optical devices for wavefront shaping to further enhance pixel contrast and signal-to-noise ratio. (3) The currently used photodetector (PD) 200 has an 80 MHz bandwidth, which severely attenuates the 2M and 3M signals. Therefore, in a preferred embodiment of the present invention, using a GaAsP photodetector (PD) 200 and a high-bandwidth transimpedance amplifier (several hundred MHz or >1 GHz) will help maintain a higher amplitude of 2M and 3M signals, thus providing a better signal-to-noise ratio.

Finally, it should be emphasized again that the above description is only a better embodiment of the invention and is not intended to limit the scope of the invention. At the same time, the above description can be understood and implemented by those who have ordinary knowledge in the relevant technical field. Therefore, other equivalent changes or modifications not divorced from the concepts disclosed in the invention should be included in the scope of patent claims of the invention.

What is claimed is:

1. An electrical high-order modulation extraction module, used to receive the RF sinusoidal signal output by a photodetector on a laser scanning microscope with a laser scanning frequency, characterized in that the electrical high-order modulation extraction module includes:
   a DC blocking filter used to filter out the DC signal on the RF sinusoidal signal output by the photodetector;
   a function generator used to provide a local oscillation frequency, wherein the local oscillation frequency is an integer multiple of the laser scanning frequency; and
   a mixer having one end receives the RF sinusoidal signal output by the DC blocking filter and the other end receives the local oscillation frequency output by the function generator, and outputs an intermediate frequency signal, wherein the intermediate frequency signal is used to down-modulate the first-order or other high-order modulation (1M or HOMs) signals to the DC coordinate position, and transmit the intermediate frequency signal to a DAQ program for pixel reconstruction.

2. The electrical high-order modulation extraction module according to claim 1, characterized in that it further includes a phase shifter used to shift the relative angular difference between the LO signal and the RF signal by a set angular difference.

3. The electrical high-order modulation extraction module according to claim 1, characterized in that the intermediate frequency signal passes through a low-pass filter.

4. The electrical high-order modulation extraction module according to claim 3, characterized in that the intermediate frequency signal that has passed through the low-pass filter is first amplified by an amplifier and then filtered by the low-pass filter.

5. The electrical high-order modulation extraction module according to claim 1, characterized in that a down-modulation circuit is formed on a substrate, and the substrate is arranged in a geometric housing to form a portable functional module, with a first connection end and a second connection end formed at both ends of the functional module, wherein the first connection end is connected to a servo terminal, and the second connection end receives the RF sinusoidal signal output by the photodetector.

6. An electrical high-order modulation extraction module, used to receive the RF sinusoidal signal output by a photodetector on a laser scanning microscope with a laser scanning frequency, characterized in that the electrical high-order modulation extraction module includes:
   a DC blocking filter used to filter out the DC signal on the RF sinusoidal signal output by the photodetector;
   a first splitter used to split the RF sinusoidal signal that has passed through the DC blocking filter into a first optical path and a second optical path;
   a function generator used to provide a local oscillation frequency, wherein the local oscillation frequency is an integer multiple of the laser scanning frequency;
   a second splitter used to split the local oscillation frequency into a quadrature path and an in-phase path;
   a first mixer, one input end of the first mixer receives the sinusoidal signal of the first optical path, and the other input end receives the quadrature path, and outputs a first intermediate frequency signal, wherein the first intermediate frequency signal is used to down-modulate the first-order modulation (1M) signal to the DC coordinate position; and
   a second mixer, one input end of the second mixer receives the sinusoidal signal of the second optical path, and the other input end receives the in-phase path, and outputs a second intermediate frequency signal, wherein the second intermediate frequency signal is used to down-modulate the first-order modulation (1M) signal to the DC coordinate position; and wherein the first intermediate frequency signal and the second intermediate frequency signal are transmitted to an arithmetic unit for calculation, and then the calculated root mean square signal is transmitted to a DAQ program for pixel reconstruction.

7. The electrical high-order modulation extraction module according to claim 6, characterized in that the quadrature path is the local oscillation frequency passed through a 90-degree phase shifter.

8. The electrical high-order modulation extraction module according to claim 6, characterized in that the arithmetic unit is configured in a servo terminal.

9. The electrical high-order modulation extraction module according to claim 6, characterized in that the first intermediate frequency signal passes through a first low-pass filter, and the second intermediate frequency signal passes through a second low-pass filter.

10. The electrical high-order modulation extraction module according to claim 9, characterized in that the first intermediate frequency signal and the second intermediate frequency signal that have passed through the first low-pass filter and the second low-pass filter are first amplified by a first amplifier and a second amplifier, and then filtered by the first low-pass filter and the second low-pass filter.

11. The electrical high-order modulation extraction module according to claim 6, characterized in that a dual-phase demodulator circuit is formed on a substrate, and the substrate is arranged in a geometric housing to form a portable functional module, with a first connection end and a second connection end formed at both ends of the functional module, wherein the first connection end is connected to a servo terminal, and the second connection end receives the RF sinusoidal signal output by the photodetector.

12. The electrical high-order modulation extraction module according to claim 1 or 6, characterized in that the DC blocking filter is a band-pass filter (BPF).

13. A method for adjusting the imaging quality of a laser scanning microscope using an electrical high-order modulation extraction module, characterized in that it includes the following steps:

providing a module manufactured by the electrical high-order modulation extraction module, and connecting the module with the laser scanning microscope and the servo terminal;

obtaining and determining whether the laser repetition frequency and the LO signal frequency are the same, by obtaining the laser repetition frequency of the laser scanning microscope and the LO signal frequency generated by the function generator through the information displayed on the servo terminal, and determining whether the LO signal frequency is a multiple of the laser repetition frequency;

correcting the LO signal frequency, by adjusting the LO signal frequency output by the function generator through the servo terminal when the LO signal frequency is not a multiple of the laser repetition frequency, so that the LO signal frequency is a multiple of the laser repetition frequency;

providing a high-order modulation signal, by obtaining a down-modulated high-order modulation signal through the calculation of the module, and transmitting the down-modulated high-order modulation signal to the DAQ program configured in the servo terminal for pixel reconstruction; and adjusting the imaging quality, by the observer sequentially selecting a down-modulated signal (1M, 2M, 3M, . . . ), and transmitting the down-modulated signal to the DAQ, and the DAQ program sequentially performing pixel reconstruction.

* * * * *